(No Model.)
C. PETERSEN.
CONDUCTOR FOR UNDERGROUND ELECTRIC RAILWAYS.
No. 585,047. Patented June 22, 1897.
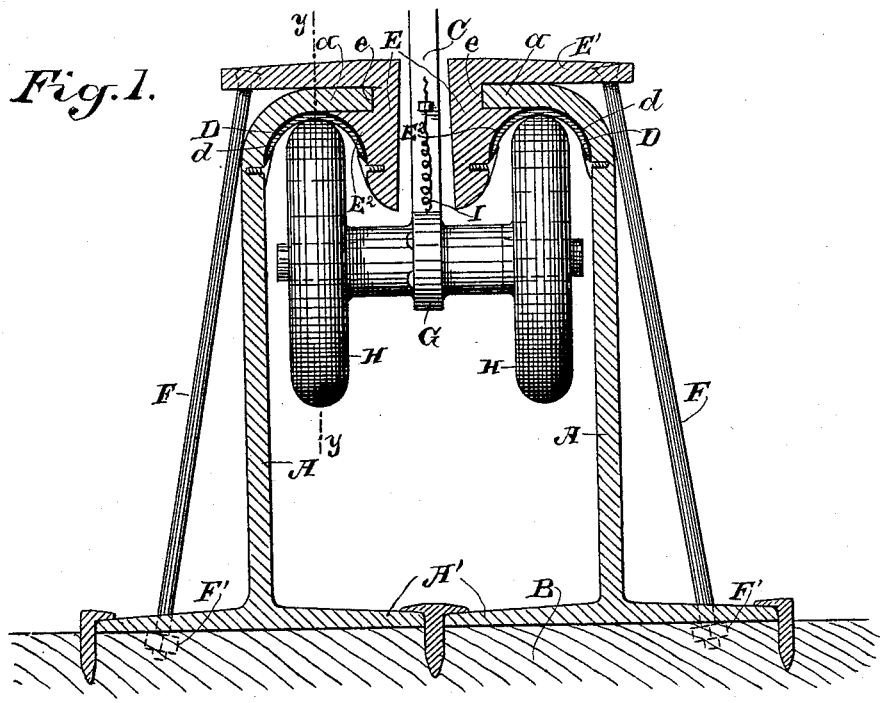
Fig. 1.
Fig. 2.
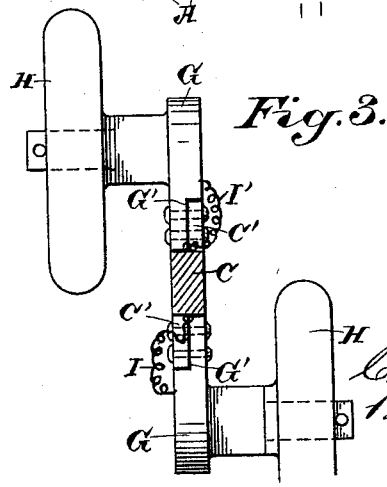
Fig. 3.
Witnesses,
Inventor,
Charles Petersen
By Dewey & Co.
Atty

UNITED STATES PATENT OFFICE.

CHARLES PETERSEN, OF SAN FRANCISCO, CALIFORNIA.

CONDUCTOR FOR UNDERGROUND ELECTRIC RAILWAYS.

SPECIFICATION forming part of Letters Patent No. 585,047, dated June 22, 1897.

Application filed January 29, 1897. Serial No. 621,234. (No model.)

*To all whom it may concern:*

Be it known that I, CHARLES PETERSEN, a citizen of the United States, residing in the city and county of San Francisco, State of California, have invented an Improvement in Conductors for Underground Electric Railways; and I hereby declare the following to be a full, clear, and exact description of the same.

My invention relates to a novel construction for underground conduits which are used in conjunction with electric railways.

It consists in details of construction which will be more fully explained by reference to the accompanying drawings, in which—

Figure 1 is a vertical section through my conduit. Fig. 2 is a longitudinal section on line $y\, y$ of Fig. 1, showing manner of connecting the sections. Fig. 3 is a top view of trolleys.

My invention consists, essentially, in the novel construction of concaved insulated conducting-plates arranged longitudinally within a tube or tunnel, so as to form the proper contacts for trolleys connected with the car and to protect the conductors from moisture.

The tube or tunnel may be constructed in various ways to suit the conditions and the position of the railway. If adapted for elevated railways, many of the details necessary for underground railways may be changed, but the essential features will be similar.

In the present case A A are angle-iron plates having the base portion formed with projecting flanges A', which flanges serve to secure the channeled-iron sides A to the cross-ties or supporting structure B, upon which the tube or tunnel is secured. The upper L-shaped portions $a$ of these plates extend toward each other, so as to form the intermediate grooves or channel through which the shank C, to which the trolley-wheels are secured, projects.

In order to secure and brace the upper edges of the angle-irons A, I have shown supplemental strips E so rolled as to have a flange E' projecting horizontally beyond the outer face of the channel-irons A and extending down between the inner ends of the angle-irons, so as to form the actual slot or channel between these faces.

At $e$ is a groove or channel which fits over the edge of the horizontal portion $a$ of the angle-iron, and within the interior these angle-irons $e$ are formed with a concaved segment $E^2$, which practically forms a continuous curve with the inner angles of the irons A, so that the conductors D are supported within this curve, as shown. Through the outer ends of the projecting portions E' holes are made for the reception of the countersunk heads of bolts F. These bolts form stays extending down through the outer flanges A' of the channel-plates A, where they are secured by nuts F', as shown. These stays serve to secure the plates E firmly in place and at the same time act as braces to steady and support the angle-plates A, thus allowing these plates to be made lighter than could otherwise be done.

Within the curved angles at the upper part of the channels formed by the side bars A and the interior curves $E^2$ are fixed the curved segmental conductors D, preferably made of copper. One of these conductors is secured upon one side and the other upon the opposite side, as shown, and they are insulated from contact with the iron by any suitable insulating material $d$, which covers the exterior, and is preferably carried around the lower edge and a short distance up into the interior of the concaves, so that any moisture or drip will pass off the edges of the conductors without forming any connection through which the electrical current may leak or escape. One of the conducting-plates D serves to carry the direct current and the other the return-current.

The shank C has the lower end made into a T-shaped foot C', and to this foot are fixed the extensions G, which carry the trolley-wheels H. These wheels have the peripheries adapted to travel within the concavities of the conductors D, and the plates G are insulated from the part C', to which they are attached by any suitable insulating material, as shown at G'. The plates G are then connected by wires I I', so the current may pass through one of these conducting-wires to the motor upon the car, thence returning through the other wire and trolley-wheel to the opposite return-conductor D. By this construction the leakage and loss of current through lack of insulation or from moisture are reduced to a minimum.

The conducting-plates D are made in sections of any suitable or convenient length, and their meeting ends are fitted with overlapping supplemental plates $D^2$, which are bolted so as to form a continuous connection, the bolt-heads being countersunk so as to leave a smooth interior surface. The supplemental angle-irons E E' are slightly separated at points where these joints of the conductor occur, and intermediate similarly-shaped pieces $E^3$ are introduced between adjacent ends of any two plates E', these being secured by stay-bolts F in the same manner as previously described for the other plates. These intermediate short sections $E^3$ can be easily removed by unscrewing the stay-bolts and taking them out of their positions, where they will expose openings made above the conductors D by cutting away a portion of the flanges $a$ of the angle-plates A, so that the joints of the conductors can easily be reached if needed. This open space is normally filled with any non-conducting cement suitable for the purpose.

Having thus described my invention, what I claim as new, and desire to secure by Letters Patent, is—

1. A subway for electric conductors consisting of a tube or tunnel formed by angle-plates, the upper edges of which approach each other to form a slot and the lower edges have flanges adapted to secure them to the supporting structure, supplemental angle-plates fitting the adjacent edges of the main channel-irons, and stay-bolts connecting the outer edges of the supplemental plates with the exterior bottom flanges of the main channel-irons.

2. A subway for electric-railway conductors consisting of channels formed of angle-irons having flanges by which they are bolted to the supporting structure, inwardly-projecting upper edges, supplemental angle-pieces adapted to clamp said upper edges of the main channel-irons with flanges projecting outwardly, and stay-bolts connecting said outwardly-projecting flanges with the bottom flanges of the main channels, and segmentally-curved ends formed upon the inner surfaces of the supplemental angle-pieces whereby a continuous curved support for the electric conductors is formed.

3. A subway for electric conductors consisting of channels formed of angle-iron with bases by which they are secured to the supporting structure, the supplemental plates fitting the adjacent edges of the angle-irons, forming the slot or channel intermediate between them, and having a concaved inner face forming a continuation with the inner curvature of the main angle-irons, segmentally-concaved conductors fitting within said curvature having an exterior coating of insulating material said conductors exposing concaved arched conducting-surfaces downwardly for the contact with trolley-wheels.

4. A subway and conductor for electric railways consisting of the angle-iron channels with supplemental angle-iron plates fitting the inner adjacent edges and forming a slot between the channel-irons, concaved arched conductors fixed beneath and within the angles upon each side of the slot having the exterior surface coated and insulated and the interior concaved surface forming a conductor, a trolley-shank having insulated extensions fixed to it within the tube or tunnel, trolley-wheels projecting from the opposite ends of said extensions toward opposite sides of the tunnel whereby one of said trolley-wheels travels within one of the conductors to receive the outflowing current, and the other in contact with the other conductor to return the current, and wires connecting the trolley-supporting extensions with the motor mechanism upon the car.

In witness whereof I have hereunto set my hand.

CHARLES PETERSEN.

Witnesses:
   GEO. H. STRONG,
   JESSIE C. BRODIE.